United States Patent [19]

Gannaway

[11] Patent Number: 4,694,660
[45] Date of Patent: Sep. 22, 1987

[54] REFRIGERATION SYSTEM INCLUDING CAPACITY MODULATION

[75] Inventor: Edwin L. Gannaway, Adrian, Mich.

[73] Assignee: Tecumseh Products Company, Tecumseh, Mich.

[21] Appl. No.: 867,802

[22] Filed: May 27, 1986

[51] Int. Cl.⁴ .................................... F25B 41/00
[52] U.S. Cl. .................................... 62/196.4; 62/197
[58] Field of Search ............... 62/196.4, 196.3, 228.5, 62/197, 117, 323.1

[56] References Cited

U.S. PATENT DOCUMENTS

| | | | |
|---|---|---|---|
| 2,949,128 | 8/1960 | Carter | 137/505.37 |
| 3,064,447 | 11/1962 | Heidorn | 62/197 |
| 3,276,221 | 10/1966 | Crumley | 62/197 |
| 3,396,550 | 8/1968 | Cawley | 62/117 |
| 3,631,684 | 1/1972 | Randall | 62/117 |
| 3,795,117 | 3/1974 | Moody, Jr. et al. | 62/197 |
| 4,006,602 | 2/1977 | Fanberg | 62/113 |
| 4,049,410 | 9/1977 | Miller | 62/197 |
| 4,065,229 | 12/1977 | Black | 62/228.3 X |
| 4,129,012 | 12/1978 | Mairs | 62/113 |
| 4,258,553 | 3/1981 | Kelly et al. | 62/117 |
| 4,326,868 | 4/1982 | Ozu et al. | 62/324.6 |
| 4,344,297 | 8/1982 | Ueno et al. | 62/196 |
| 4,446,704 | 5/1984 | Yamazaki et al. | 62/180 |
| 4,462,219 | 7/1984 | Iwata | 62/196.1 |
| 4,471,632 | 9/1984 | Nishi et al. | 62/228.5 X |
| 4,550,574 | 11/1985 | Hohman | 62/197 |

OTHER PUBLICATIONS

Ashrae Systems Handbook, pp. 24.25 & 24.26.

Primary Examiner—William E. Wayner
Attorney, Agent, or Firm—Jeffers, Hoffman & Niewyk

[57] ABSTRACT

A refrigeration system adapted particularly for a vehicle air conditioning system and including a capacity modulation mechanism. A portion of the liquid refrigerant at the outlet of the condenser is fed back to the suction chamber of the compressor through the orifice of a bypass valve. The valve is mounted on the compressor and is responsive to suction chamber pressure. As the evaporator temperature decreases, suction chamber pressure also decreases thereby opening the valve to meter a small amount of bypassed liquid refrigerant into the suction chamber of the compressor. A portion of the hot discharge gas may also be bypassed back into the suction chamber through the same valve that meters the bypassed liquid refrigerant.

26 Claims, 7 Drawing Figures

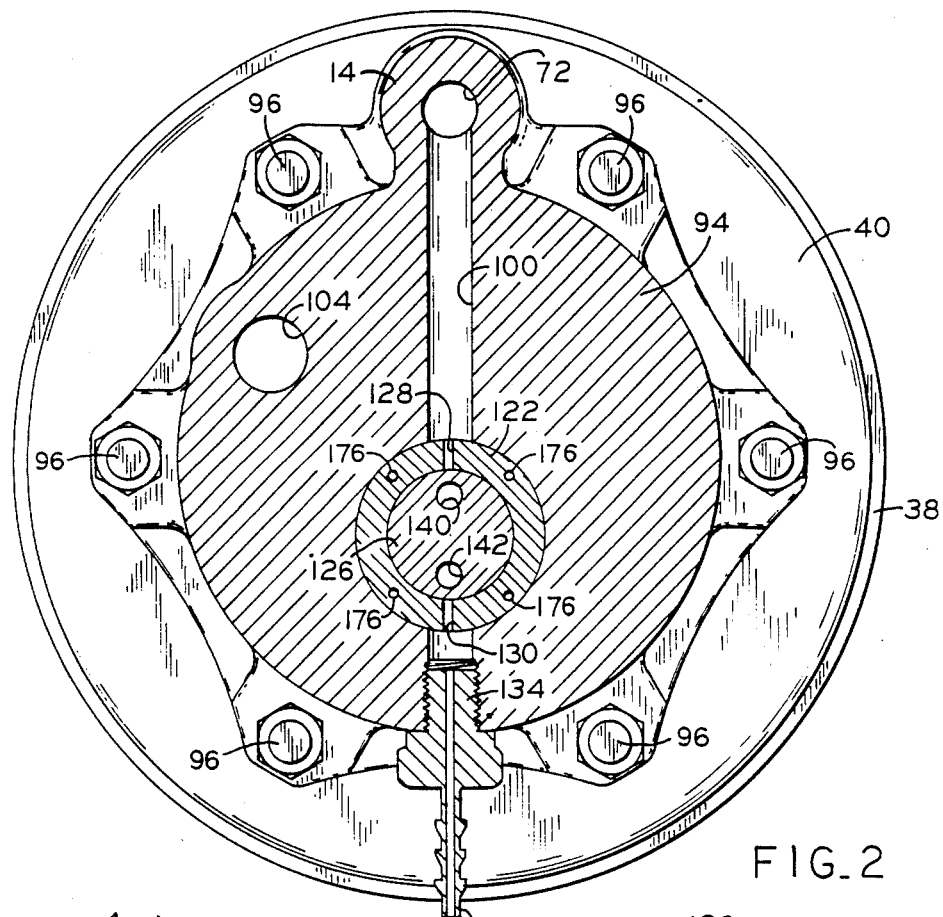
FIG_2
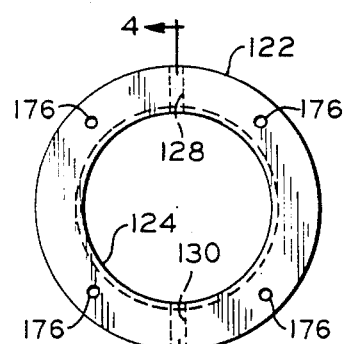
FIG_3
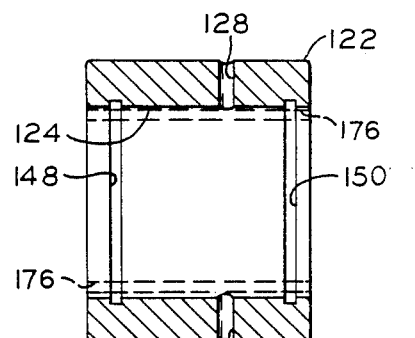
FIG_4
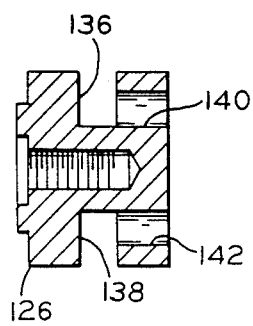
FIG.6
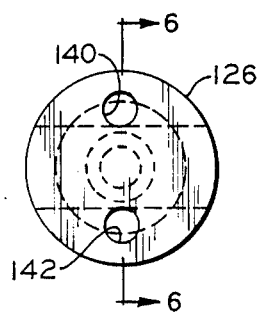
FIG_5

REFRIGERATION SYSTEM INCLUDING CAPACITY MODULATION

BACKGROUND OF THE INVENTION

The present invention relates to a refrigeration system and in particular to a refrigeration system and compressor wherein hot discharge gas and liquid refrigerant are bypassed to the suction side of the compressor in order to provide for modulation of cooling capacity. The refrigeration system is particularly adapted for use in a vehicle air conditioning system.

In automotive air conditioning systems, if the ambient temperature is quite high, the air conditioner refrigeration system normally operates continuously in order to maintain the desired temperature within the vehicle. However, under cooler ambient temperature conditions, continuous operation of the compressor provides too much cooling capacity so that the temperature of the evaporator decreases below freezing and ice forms on the evaporator fins. Such undesirable freezing up of the evaporator is even more likely to occur under high humidity conditions.

One known way to prevent evaporator freeze up and modulate the capacity of the refrigeration system is to cycle the compressor off when the evaporator becomes too cold. A disadvantage to this technique is that the repeated cycling on and off of the compressor is likely to produce accelerated wear of the clutch plates and other parts of the compressor due to the rapid acceleration of the compressor moving parts when the clutch plates are engaged. In vehicles with small engines there is a further disadvantage in that the intermittent loading and unloading of the engine as the compressor cycles on an off causes a noticeable variation in engine speed.

Another prior art technique for modulating the capacity of the refrigeration system is to employ a compressor having variable displacement. In a swash plate compressor, the pitch of the swash plate can be varied to thereby change displacement. In multi-cylinder compressors, one or more cylinders can be blocked to thereby partially unload the compressor. However, the mechanisms for displacement variation are typically complicated and may require sophisticated controls.

One known possibility is to bypass a portion of the discharge gas to the suction side of the compressor, but this normally causes a rise in the temperature of the compressor to unacceptably high levels. Another known possibility is to bypass a portion of the liquid to the suction side of the compressor in response to suction gas temperature in order to maintain a substantially constant predetermined super-heat of the suction gas entering the compressor.

Although bypassing of liquid refrigerant from the condenser or hot discharge gas from the discharge side of the compressor will affect the capacity of the compressor, such prior art attempts at providing capacity control have not been effective in providing smooth control over the full range of ambient temperatures experienced by a vehicle air conditioning system.

SUMMARY OF THE INVENTION

In accordance with the present invention, in one form thereof, a portion of the hot discharge gas from the discharge side of the compressor and a portion of the liquid refrigerant from the outlet side of the condenser are fed back to the suction chamber of the compressor. The bypassed discharge gas and liquid refrigerant are metered into the suction chamber of the compressor by means of a valve which is responsive to suction chamber pressure. Thus, both the discharge gas and liquid are metered into the suction cavity simultaneously and proportionately in response to suction cavity pressure. Because of the substantially higher pressure of the discharge gas, it is desirable that mixing of the bypassed discharge gas and liquid refrigerant not occur until the suction cavity, and for this reason, the two fluids are maintained segregated in the valve.

In the preferred embodiment, positive pressure within the suction cavity maintains the bypass valve closed. However, when the evaporator temperature begins to decrease, suction pressure drops, and a return spring acting on the valve piston begins to open the valve thereby permitting hot gas and liquid refrigerant to be metered into the suction cavity. The injected liquid flashes in the compressor suction cavity. This results in an increase in evaporator pressure and temperature, thereby reducing the capacity of the compressor. The bypassed discharge gas lowers head pressure and reduces the compressor brake horsepower. As the pressure of the evaporator increases, this increases suction pressure thereby tending to close the bypass valve. Accordingly, the system is self-modulating and is capable of maintaining evaporator temperature essentially constant. By bypassing a portion of the liquid refrigerant around the evaporator, less refrigerant is available for extracting heat, thereby resulting in increased evaporator temperature.

In a preferred form of the invention, the flow of bypassed refrigerant is restricted by an orifice in the valve on the suction side of the compressor so that the liquid flashes when it is discharged from the valve into the much larger expansion volume of the suction chamber. Since the bypassed discharge gas is not mixed with the bypass refrigerant until the liquid refrigerant and discharge gas both reach the suction chamber, vapor lock preventing bypassing of the liquid refrigerant will not occur.

By combining both discharge gas bypass and liquid refrigerant bypass, it is possible to reduce the capacity of the refrigeration system to zero at a given minimum evaporator temperature. As the evaporator temperature rises, the bypass valve will meter less bypassed gas and liquid refrigerant into the compressor until the proper evaporator temperature is again achieved.

The invention, in one form thereof, relates to a refrigeration system including capacity modulation and having a compressor including a suction chamber and a discharge side, a condenser having an inlet side connected to the discharge side of the compressor and an outlet side, and an evaporator connected between the outlet side of the condenser and the suction chamber of the compressor. A liquid bypass conduit is connected between the outlet side of the condenser and the suction chamber of the compressor for bypassing a portion of the liquid refrigerant from the condenser around the evaporator to the compressor suction chamber. A pressure responsive valve on the compressor having an inlet connected to the bypass conduit and an outlet opening into the suction chamber opens and closes in response to pressure in the suction chamber for the purpose of metering bypassed liquid refrigerant into the suction chamber to thereby vary the cooling capacity of the compressor.

The refrigeration system of the invention, in accordance with another form thereof, comprises a liquid bypass conduit connected between the outlet side of the condenser and the suction side of the compressor to bypass a portion of the liquid refrigerant from the condenser around the evaporator to the suction side of the compressor. A pressure responsive valve is connected to the bypass conduit for metering the bypassed liquid refrigerant to the suction side of the compressor, the valve opening and closing in response to the pressure at the suction side of the compressor.

The refrigeration system of the invention, in accordance with another form thereof, further comprises a hot discharge gas bypass passage connected to the discharge side of the compressor for bypassing a portion of the gaseous discharge refrigerant into the suction side of the compressor. A pressure responsive valve on the compressor has an inlet connected to the liquid bypass conduit and an outlet opening into the suction chamber and opens and closes in response to pressure in the suction chamber for metering bypassed liquid refrigerant into the suction chamber to thereby vary the capacity of the compressor.

In accordance with one form of the invention, the valve has a second inlet connected to the discharge gas bypass passage and an outlet connected to the suction chamber for variably metering bypassed discharge gas into the suction chamber in response to a control parameter indicating a desired change in cooling capacity of the compressor. In a preferred form of the invention, the control parameter is the suction chamber pressure.

The invention also relates to a refrigeration compressor including capacity modulation having a suction chamber and a discharge chamber. A pressure responsive valve has a liquid refrigerant bypass inlet and an outlet opening into the suction chamber. The valve opens and closes in response to the pressure in the suction chamber for metering bypassed liquid refrigerant into the suction chamber to thereby vary the cooling capacity of the compressor. A hot discharge gas bypass passage is connected between the discharge chamber and suction chamber for bypassing a portion of the discharge gas and mixing the bypassed gas with bypassed liquid refrigerant in the suction chamber. Preferably, the gas discharge passage is connected to the pressure responsive valve, which meters bypassed discharge gas in response to compressor suction pressure.

An object of the present invention is to provide a refrigeration system including capacity modulation wherein the compressor can run continuously and the capacity is modulated by bypassing liquid refrigerant or liquid refrigerant and hot discharge gas.

A further object of the present invention is to provide a capacity modulation system for a compressor which does not require a complicated control system or an electrical power source.

Another object of the present invention is to provide a capacity varying mechanism for a refrigeration system that is self-modulating.

Yet another object of the present invention is to provide a refrigeration system having a capacity modulation mechanism which is uncomplicated and comprises few moving parts, thereby enhancing reliability and reducing the occasion for maintenance.

BRIEF DESCRIPTION OF THE DRAWINGS

These and other objects of the present invention will become more apparent from the detailed description read together with the accompanying drawings wherein:

FIG. 2 is a sectional view of FIG. 1 taken along line 2—2 and viewed in the direction of the arrows;

FIG. 3 is an enlarged end elevational view of the valve cylinder;

FIG. 4 is a sectional view taken along line 4—4 of FIG. 3 and viewed in the direction of the arrows;

FIG. 5 is an end elevational view of the valve piston;

FIG. 6 is a sectional view of FIG. 5 taken along line 6—6 and viewed in the direction of the arrows.

DETAILED DESCRIPTION OF A PREFERRED EMBODIMENT

Figure 1:
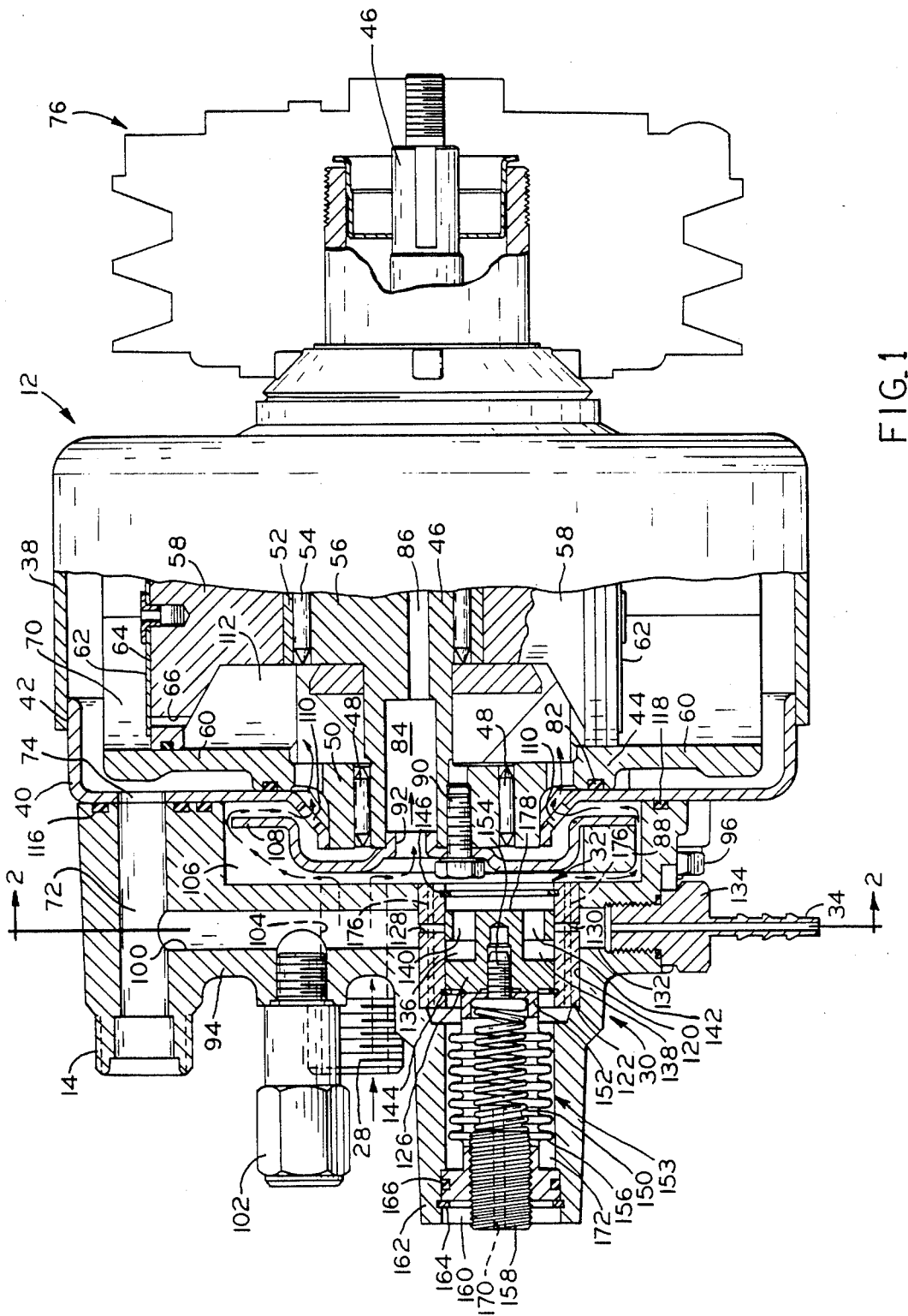
FIG. 1 is a substantially full scale side elevational view, shown partially in section, of a belt driven vehicle compressor including the capacity modulation mechanism in accordance with a preferred embodiment of the present invention.
Figure 7:
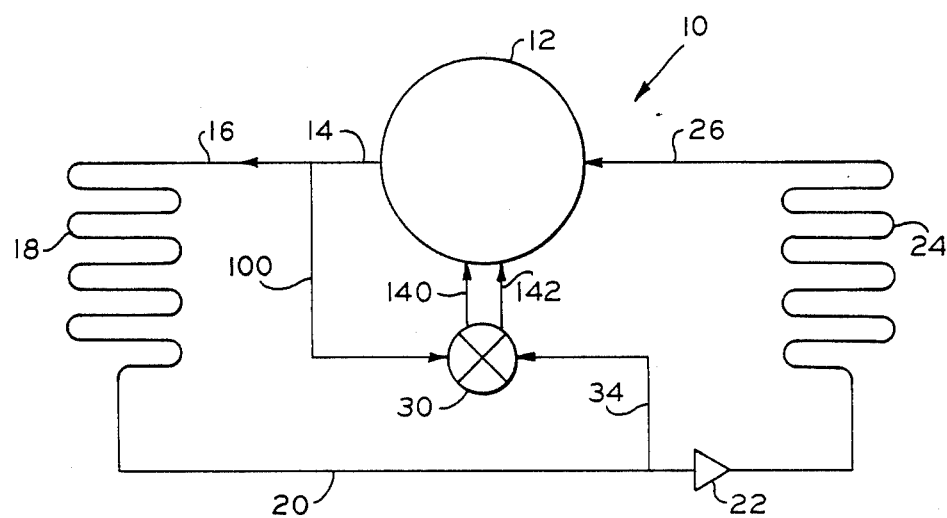
FIG. 7 is a schematic diagram of the refrigeration system in accordance with a preferred embodiment of the present invention.

Referring now to the drawings, and in particular to FIG. 7, the refrigeration system according to the present invention is shown schematically. The refrigeration system 10 comprises a high side compressor 12 having its discharge outlet 14 connected by a line 16 to condenser 18. Condenser 18 is connected by line 20 through expansion valve or capillary tube 22 to evaporator 24, the latter being connected by line 26 to the suction inlet 28 of compressor 12.

Bypass valve 30 has its outlet 32 connected to the suction chamber of compressor 12 and is responsive to the pressure therein to meter bypassed liquid refrigerant and bypassed hot discharge gas into the suction chamber. Liquid refrigerant bypass line 34 is connected from the outlet side of condenser 18 to one of the inlets of bypass valve 30, and hot discharge gas bypass line 100 is connected between discharge outlet 14 of compressor 12 and the other inlet of bypass valve 30.

Referring now to FIGS. 1-6, the details of compressor 12 and the manner in which compressor 12 and the refrigeration system of FIG. 7 operates will be described. Compressor 12 is a split crankcase, radial scotch yoke vehicle compressor similar to that described in U.S. Pat. No. 4,358,251 issued to the assignee of the present invention. Said patent is expressly incorporated herein by reference. Compressor 12 comprises a front housing half 38 and a rear housing half 40 which are hermetically joined together at seam 42 and enclose and support crankcase 44. Crankshaft 46 is received within crankcase 44 and is supported on needle bearings 48 received within main bearing portion 50 for rotation within crankcase 44. Yoke slide 52 is disposed around bearings 54 and eccentric portion 56 of crankshaft 46. Two pairs of opposing pistons 58, only one of which is illustrated, are positioned over yoke slide 52 and reciprocate within crankcase cylinders 60 as crankshaft 46 rotates. Suction valves 62 are connected to the upper surfaces 64 of pistons 58 and open and close suction passages 66 as pistons 58 reciprocate. Discharge chamber 70 surrounds pistons 58 and communicates with discharge passage 72 through port 74. Crankcase 44 is sealed against rear housing by O-ring 82.

Crankshaft 46 is driven by pulley and clutch assembly 76 mounted on the forward end of crankshaft 46. Pulley and clutch assembly 76 is substantially as shown in the aforementioned U.S. Pat. No. 4,358,251.

Crankshaft 46 includes passages 84 and 86 to transmit a portion of the suction refrigerant to pulley and clutch mechanism 76 for lubricating and cooling thereof. Counterweight assembly 88 is connected to the face of crankcase 44 by screw 90, and includes an opening 92 in the face thereof for the passage of suction refrigerant into passage 84.

Bypass valve 30 comprises a valve body 94 mounted to housing 40 and crankcase 44 by means of a plurality of screws 96 (FIG. 2). Valve body 94 has discharge passage 72 formed therein and bypass passage 100 intersecting discharge passage 72. A pressure relief valve 102 is connected to passage 100 and is set to open if excessively high discharge pressures occur. Suction inlet 28 is connected by suction passage 104 to suction chamber 106. Suction refrigerant, which is normally in the gaseous state, flows into crankshaft passage 84 through passage 92, and flows around the flange portion 108 of counterweight assembly 88, through openings 110 into suction chamber 112 on the suction side of pistons 58. Discharge passage 72 is sealed by O-ring 116 and suction chamber 106 is sealed by O-ring 118.

Press fit within bore 120 of valve body 94 is valve cylinder 122, which is shown in greater detail in FIGS. 3 and 4. Cylinder 122 comprises a center bore 124 within which valve piston 126 (FIGS. 5 and 6) is slidably received. Valve cylinder 122 comprises a hot discharge gas inlet 128 that communicates with discharge passage 100, and further comprises a bypass liquid refrigerant inlet 130 that communicates with bypass refrigerant line 34 (FIG. 7) through bore 132 and fitting 134.

Piston 126 (FIGS. 5 and 6) comprises a pair of segmented annuli 136 and 138 sealed from each other and communicating respectively with outlet openings 140 and 142. Piston 126 is slidably received within the bore 124 of valve cylinder 122, and the axial travel thereof is limited by snap rings 144 and 146 received in grooves 148 and 150, respectively.

Piston 126 is urged toward its open position in which openings 136 and 138 are in register with valve cylinder orifices 128 and 130 by return spring 150 seated within spring cup 152 of bellows assembly 153 connected to piston 126 by screw 154. Spring 150 is received within bellows 156 and held under compression by valve plug 158 threadedly connected to the cap portion 160 of the bellows assembly. Flexible bellows 156 is sealed to cup 152 and cap 160, the latter being connected to portion 162 of valve body 94 by snap ring 164. O-ring 166 seals cap portion 160 against valve body 162.

The interior of bellows 156 is vented to the atmosphere through passage 170 in plug 158, and the chamber 172 on the exterior of bellows 156 is connected to suction pressure by four axial passages 176. Suction pressure acting on bellows 156 urges the piston toward the closed position against the force of spring 150. The compression force of spring 150 can be adjusted by turning plug 158, to thereby adjust the suction chamber pressure at which valve 30 will open.

It is desirable that the bypassed liquid refrigerant from line 34 (FIG. 7) be metered through orifice 130 at the valve and then expand within suction chamber 106, where the refrigerant will flash to its gaseous state. In order to prevent the higher pressure discharge gas from blocking the flow of liquid refrigerant through inlet 130, discharge gas and bypassed liquid refrigerant are maintained segregated in valve 30 until they are discharged into suction chamber 106, at which point the liquid refrigerant will flash and mix with the bypassed discharge gas. Orifices 128 and 130 for the discharge gas and bypassed liquid refrigerant, respectively, may have diameters of 0.080 inch, for example.

The compressor 12 and refrigeration system 10 operates in the following manner. On start up, positive pressure is generated within suction chamber 106, 112, which forces valve piston 126 to the left as viewed in FIG. 1 against the force of spring 150. Refrigerant is pumped through condenser 118, where it condenses, and is then evaporated through expansion valve or capillary 22 into evaporator 24 before being returned to suction chamber 106, 112 by line 26. If ambient conditions are such that the evaporator 24 begins to cool excessively, the pressure within suction chamber 106, 112 will drop, thereby permitting valve piston 126 to move to the right and at least partially uncover orifices 128 and 130 connected to discharge gas bypass passage 100 and liquid bypass line 34. This will permit a portion of the discharge gas and liquid refrigerant to flow through openings 136, 138 and 140, 142 into suction chamber 106 whereupon the bypassed liquid refrigerant will flash to its gaseous state and mix with the bypassed discharge gas. The bypassed refrigerant will mix with incoming refrigerant through suction inlet 28, flow through openings 110 into chamber 112 and be pumped into discharge chamber 170 through passages 66 past suction valves 62.

The bypassing of the liquid refrigerant raises the pressure and temperature of evaporator 24. Furthermore, by bypassing the evaporator with a portion of the refrigerant, less refrigerant is available to extract heat from the ambient. The net result of this is an increase in the temperature of the evaporator, which will cause a concomitant increase in suction pressure, thereby urging valve piston 126 toward its closed position. Thus, the valve mechanism 130 is self-modulating, and by properly adjusting the force of spring 150, evaporator 24 can be maintained at a substantially constant temperature.

It has been found that by mixing a portion of bypassed discharge gas with the bypassed liquid refrigerant, the capacity of compressor 112 can be reduced to zero at a given minimum evaporator temperature, for example 25° F. By bypassing both hot gas and liquid refrigerant, the evaporator temperature can be maintained above 32° F., thereby preventing evaporator freeze-up.

This results in reduced head temperatures and pressures thereby resulting in lower brake horsepower and a compressor which runs cooler and quieter. The compressor is able to run continuously with the capacity being self-modulated through the opening and closing of bypass valve 30.

It is desirable that the liquid refrigerant be flashed within the compressor suction chamber 106 rather than prior to entering the compressor, and this is the reason that valve 130 is mounted directly to suction chamber 106. This also results in good mixing of bypassed discharge gas with bypassed liquid refrigerant, because the two will mix in their gaseous state subsequent to flashing of the bypassed liquid refrigerant. Although the invention has been described in terms of a refrigerant system for a vehicle air conditioner, in which application it is particularly advantageous, it can also be applied to other refrigeration systems.

While this invention has been described as having a preferred design, it will be understood that it is capable of further modification. This application is, therefore, intended to cover any variations, uses, or adaptations of the invention following the general principles thereof and including such departures from the present disclosure as come within known or customary practice in the art to which this invention pertains and fall within the limits of the appended claims.

What is claimed is:

1. A refrigeration system including capacity modulation comprising:
   a compressor having a suction chamber and a discharge side,
   a condenser having an inlet side connected to the discharge side of the compressor and an outlet side,
   an evaporator connected between the outlet side of the condenser and the suction side of the compressor,
   a liquid bypass conduit means connected between the outlet side of the condenser and the suction chamber of the compressor for bypassing a portion of the liquid refrigerant from the condenser around the evaporator to the compressor suction chamber, and
   pressure responsive valve means on said compressor having an inlet connected to said bypass conduit means and an outlet opening into said suction chamber, said valve means opening and closing in response to the pressure in said suction chamber for metering bypassed liquid refrigerant into said suction chamber to thereby vary the cooling capacity of the compressor, wherein said valve means outlet opens directly into said suction chamber whereby the bypassed liquid refrigerant can expand immediately upon discharge from said valve means.

2. The refrigeration system of claim 1 and including a hot discharge gas bypass passage connected between the discharge side of said compressor and said suction chamber for bypassing a portion of the discharge gas and mixing the bypassed gas with bypassed liquid refrigerant in the suction chamber.

3. The refrigeration system of claim 2 wherein said gas discharge passage is connected to said valve means, and said valve means meters bypassed discharge gas and bypassed liquid refrigerant proportionately into the suction chamber.

4. The refrigeration system of claim 3 wherein the bypassed gas and bypassed liquid are unmixed with each other prior to discharge from said valve means.

5. The refrigeration system of claim 1 wherein said valve means comprises an orifice through which the bypassed liquid refrigerant flows, and the bypassed liquid refrigerant expands in said suction chamber.

6. The refrigeration system of claim 5 and including a hot discharge gas bypass passage connected between the discharge side of said compressor and said suction chamber for bypassing a portion of the discharge gas and mixing the bypassed gas with bypassed liquid refrigerant in the suction chamber, and including a separate orifice through which the bypassed discharge gas flows before entering the suction chamber.

7. The refrigeration system of claim 1 including means connected to the discharge side of the compressor for bypassing a portion of the hot discharge gas, and said valve means includes means for metering a controllable amount of the bypassed gas into said suction chamber.

8. The refrigeration system of claim 7 wherein said valve means includes separate orifices for the bypassed gas and liquid refrigerant and means for discharging the bypassed gas and liquid refrigerant into an expansion area of the suction chamber to thereby permit expansion of the bypassed gas and liquid refrigerant.

9. The refrigeration system of claim 1 wherein said valve means meters the bypassed liquid in an amount responsive to the suction chamber pressure to maintain the evaporator at a substantially constant temperature.

10. A refrigeration system comprising:
    a compressor having a suction side and a discharge side,
    a condenser having an inlet side connected to the discharge side of the compressor and an outlet side,
    an evaporator connected between the outlet side of the condenser and the suction side of the compressor,
    a liquid bypass conduit means connected between the outlet of the condenser and the suction side of the compressor for bypassing a portion of the liquid refrigerant from the condenser around the evaporator to the suction side of the compressor, and
    pressure sensitive valve means connected to said bypass conduit means for metering the bypassed liquid refrigerant to the suction side of said compressor, said valve means opening and closing in response to the pressure at the suction side of said compressor, the suction side of said compressor including an expansion volume, and said valve means including an opening that discharges the bypassed liquid refrigerant directly into the expansion volume whereupon the liquid refrigerant can flash into a gaseous state.

11. The refrigeration system of claim 10 including hot discharge gas bypass means connected to said valve means and to the discharge side of the compressor for bypassing a portion of the discharge gas, and said valve means meters the bypassed discharge gas into the expansion volume for mixing therein with the bypassed liquid refrigerant.

12. A refrigeration system including capacity modulation comprising:
    a compressor having a suction chamber and a discharge side,
    a condenser having an inlet side connected to the discharge side of the compressor and an outlet side,
    an evaporator connected between the outlet side of the condenser and the suction side of the compressor,
    a liquid bypass conduit means connected between the outlet side of the condenser and the suction chamber of the compressor for bypassing a portion of the liquid refrigerant from the condenser around the evaporator to the compressor suction chamber,
    a hot discharge gas bypass passage means connected to the discharge side of said compressor for bypassing a portion of the gaseous discharge refrigerant directly into the suction chamber of said compressor, and
    pressure sensitive valve means on said compressor having an inlet connected to said liquid bypass conduit means and an outlet opening directly into said suction chamber, said valve means opening and closing in response to the pressure in said suction chamber for metering bypassed liquid refrigerant into said suction chamber to thereby vary the cooling capacity of the compressor.

13. The refrigeration system of claim 12 wherein said discharge bypass passage is connected to a second inlet of said valve means, and said valve means meters discharge gas from said discharge bypass passage directly into said suction chamber in response to the pressure in said suction chamber.

14. The refrigeration system of claim 12 wherein said valve means includes a second inlet separate from said first mentioned valve inlet and a second outlet, said discharge bypass passage being connected to said second inlet, said valve means metering both the bypassed liquid and bypassed discharge gas directly into said suction chamber in proportional amounts in response to pressure changes in said suction chamber, the bypassed liquid and bypassed discharge gas being unmixed prior to said valve means.

15. The refrigeration system of claim 14 wherein said compressor comprises a valve body in which said valve means is received, said valve means includes a cylinder in said valve body having said valve inlets therein and a piston means slidably received in said cylinder for opening and closing said valve inlets in response to pressure change in said suction chamber, said discharge bypass passage being in said valve body and connected to said second inlet.

16. The refrigeration system of claim 15 wherein said valve inlets are positioned on opposite sides of said valve cylinder.

17. The refrigeration system of claim 15 wherein said valve means includes spring bias means for urging said valve means piston toward the open position against the pressure in said suction chamber.

18. The refrigeration system of claim 12 wherein said discharge bypass passage is connected to said valve means and said valve means includes means for metering bypassed discharge gas and bypassed liquid refrigerant proportionately into said suction chamber responsive to suction chamber pressure.

19. The refrigeration system of claim 12 wherein said compressor is a vehicle air conditioning system compressor comprising a clutch adapted to be driven by the engine of the vehicle.

20. A refrigeration system including capacity modulation comprising:
a compressor having a suction chamber and a discharge side,
a condenser having an inlet side connected to the discharge side of the compressor and an outlet side,
an evaporator connected between the outlet side of the condenser and the suction side of the compressor,
a liquid bypass conduit means connected between the outlet side of the condenser and the suction chamber of the compressor for bypassing a portion of the liquid refrigerant from the condenser around the evaporator to the compressor section chamber,
a hot discharge gas bypass passage means connected to the discharge side of said compressor for bypassing a portion of the gaseous refrigerant from the discharge side of the compressor, and
valve means having inlets connected respectively to said liquid bypass conduit means and said gas bypass passage means, and outlets connected directly to said suction chamber for variably metering bypassed discharge gas and bypassed liquid refrigerant into said suction chamber in response to a control parameter indicating a desired change in capacity.

21. The refrigeration system of claim 20 wherein the control parameter is a condition at a particular location in the refrigeration system, and said valve means is responsive to said condition.

22. The refrigeration system of claim 21 wherein said condition is the pressure in said suction chamber.

23. A refrigeration compressor including capacity modulation comprising:
a suction chamber and a discharge chamber,
pressure responsive valve means having a liquid refrigerant bypass inlet and an outlet opening directly into said suction chamber, said valve means opening and closing in response to the pressure in said suction chamber for metering bypassed liquid refrigerant directly into said suction chamber to thereby vary the cooling capacity of the compressor, and
a hot discharge gas bypass passage connected between the discharge chamber and directly to said suction chamber for bypassing a portion of the discharge gas and mixing the bypassed gas with bypassed liquid refrigerant in the suction chamber.

24. The compressor of claim 23 wherein said gas discharge passage is connected to said valve means, and said valve means meters bypassed discharge gas and bypassed liquid refrigerant proportionately into the suction chamber.

25. The compressor of claim 24 wherein said valve means includes separate orifices for the bypassed gas and liquid refrigerant and means for discharging the bypassed gas and liquid refrigerant into an expansion area of the suction chamber to thereby permit expansion of the bypassed gas and liquid refrigerant.

26. The compressor of claim 23 wherein said valve means comprises an orifice through which the bypassed liquid refrigerant flows, and the bypassed liquid refrigerant expands in said suction chamber.

* * * * *